United States Patent [19]

Sumiyoshi et al.

[11] Patent Number: 4,733,349

[45] Date of Patent: Mar. 22, 1988

[54] METHOD FOR RECORDING AND MANAGING PROCESSING HISTORY INFORMATION USING A PLURALITY OF STORAGE DEVICES

[75] Inventors: Takashi Sumiyoshi, Yokohama; Toshiyuki Kinoshita, Tokyo, both of Japan

[73] Assignee: Hitachi, Ltd., Tokyo, Japan

[21] Appl. No.: 622,158

[22] Filed: Jun. 19, 1984

[30] Foreign Application Priority Data

Jun. 20, 1983 [JP] Japan .............................. 58-110433

[51] Int. Cl.⁴ .............................................. G06F 3/06
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,027,291 | 5/1977 | Tokura et al. | 364/200 |
| 4,080,652 | 3/1978 | Cronshaw et al. | 364/200 |
| 4,084,231 | 4/1978 | Capozzi et al. | 364/200 |
| 4,313,158 | 1/1982 | Porter et al. | 364/200 |
| 4,366,536 | 12/1982 | Kohn | 364/200 |
| 4,430,701 | 2/1984 | Christian et al. | 364/200 |
| 4,442,503 | 4/1984 | Schütt et al. | 364/900 |
| 4,450,525 | 5/1984 | Demuth et al. | 364/200 |
| 4,583,165 | 4/1986 | Rosenfeld | 364/200 |

Primary Examiner—Gary V. Harkcom
Assistant Examiner—Randy W. Lacasse
Attorney, Agent, or Firm—Antonelli, Terry & Wands

[57] ABSTRACT

A plurality of external storage devices for storing therein data processing history information. The history information obtained from the processing executed in a data processing system is cyclically written in principle in these external storage devices each time the history information occurs, thereby distributing the load required for the processing to store the history information.

5 Claims, 6 Drawing Figures

METHOD FOR RECORDING AND MANAGING PROCESSING HISTORY INFORMATION USING A PLURALITY OF STORAGE DEVICES

BACKGROUND OF THE INVENTION

The present invention relates to a method for collecting and referencing information as to the processing history in a data processing system, and in particular, to a system for distributing an online journal load by means of a direct access storage devices (to be referred to simply as DASD's hereinafter) suitable for an online system having a considerably high traffic.

In an online journal system in which processing, such as file update, message input and output, and the like operations are carried out, it is an essential factor to increase the reliability for collecting and for referencing information. There have been proposed a variety of systems for collecting information as to the processing history in this kind of data processing system. The data items, however, have been serially collected according to the order of data occurrence on a recording medium. Detailed description of such systems will be found in the U.S. application Ser. No. 536,875, now U.S. Pat. No. 4,652,940 by the present inventor hereby incorporated by reference. In such a system, if a processing system has a high traffic, a DASD such as a disk unit cannot be utilized in place of a magnetic tape unit because the input/output time of a disk unit is several times longer as compared with that of a magnetic tape unit, hence the recording medium is limited to a magnetic tape. In a large online system, for example, that used by a large bank or the like enterprise, the number of data items which are inputted from or outputted to terminal equipment reaches approximately 500 thousand per day. If magnetic tapes are adopted as recording media, at least 25 magnetic tapes (approx.) will be required to be changed each day, which leads to the disadvantage that the operator's load is increased and a deteriorated operability results.

SUMMARY OF THE INVENTION

Accordingly, it is an object of the present invention to allow DASD's of large store capacity to be utilized as storage devices for recording the journal, thereby to overcome the problems described above.

In accordance with the present invention, a plurality of external storage devices for collecting information relating to the processing history in a data processing system are disposed in a parallel manner to distribute the load among the external storage devices and thus to reduce the load imposed on each storage device; moreover, the processing history information is collected in the external storage devices according to the order of occurrence of the information item so that each device stores the information equally, unless a failure takes place, that is, the information items are stored in a so-called round-robin system, and the collected information is accessed according to the order of occurrence of the information item or the lastest occurrence thereof.

DESCRIPTION OF THE PREFERRED EMBODIMENT

Figure 1:
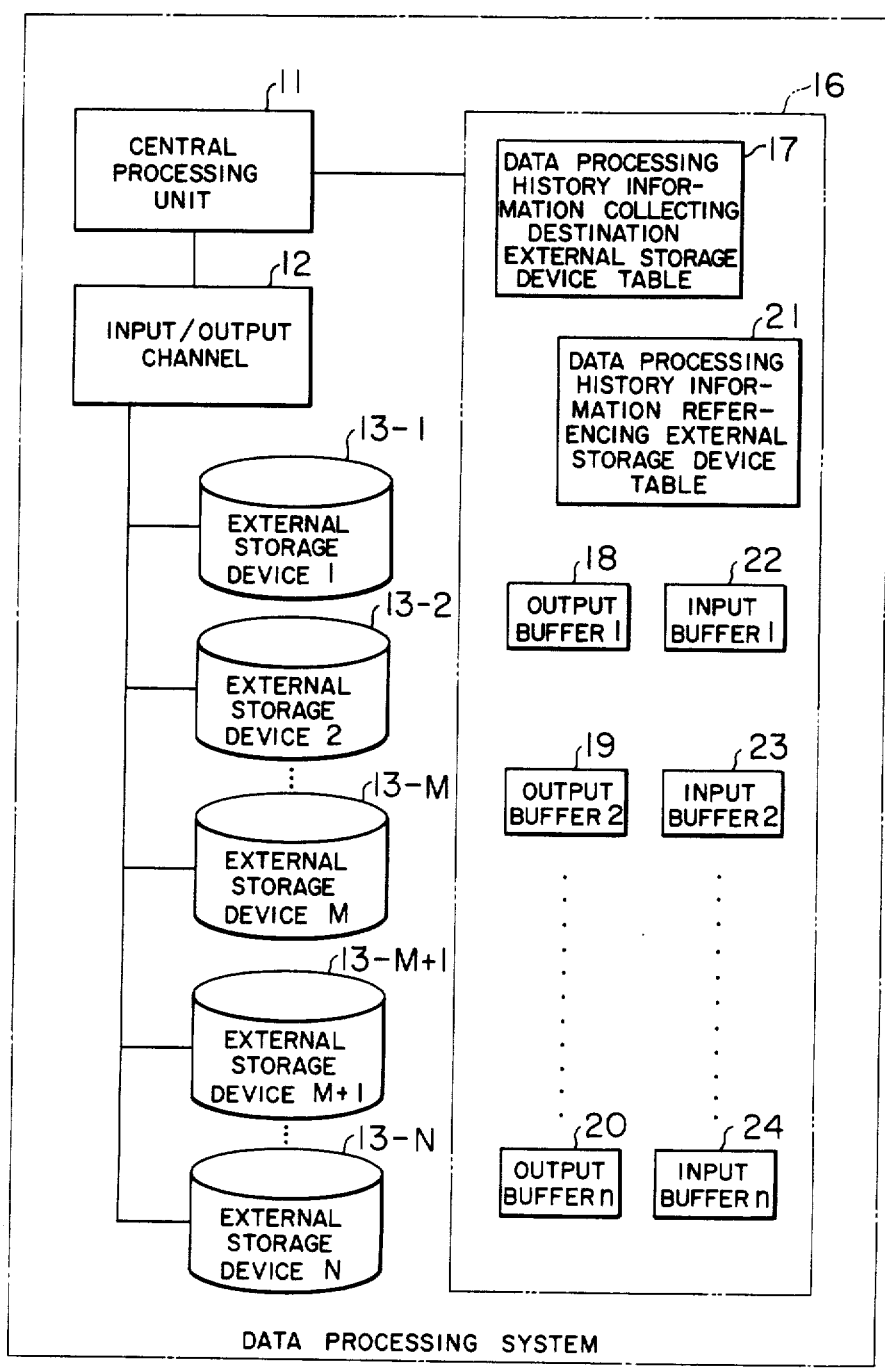
FIG. 1 is a block diagram illustrating an example of a data processing system utilizing the online journal load distribution system in accordance with the present invention.

FIG. 1 is a block diagram illustrating an embodiment in accordance with the present invention. Referring to FIG. 1, a plurality of external storage devices 13-1 to 13-N for collecting (that is, for storing therein) the history information resulting from data processing are connected through an input/output channel 12 to a central processing unit 11 for processing the input data. A table 17 for determining an external storage device in which the history information of the data processing is to be collected, the output buffers 18–20 for storing therein data to be collected, a table 21 for determining an external storage device to be accessed to reference the processing history information stored in the external storage device, and the input buffers 22–24 in which the data to be referenced is temporarily stored are provided in a main storage device 16 connected to the central processing unit 11.

Figure 2:
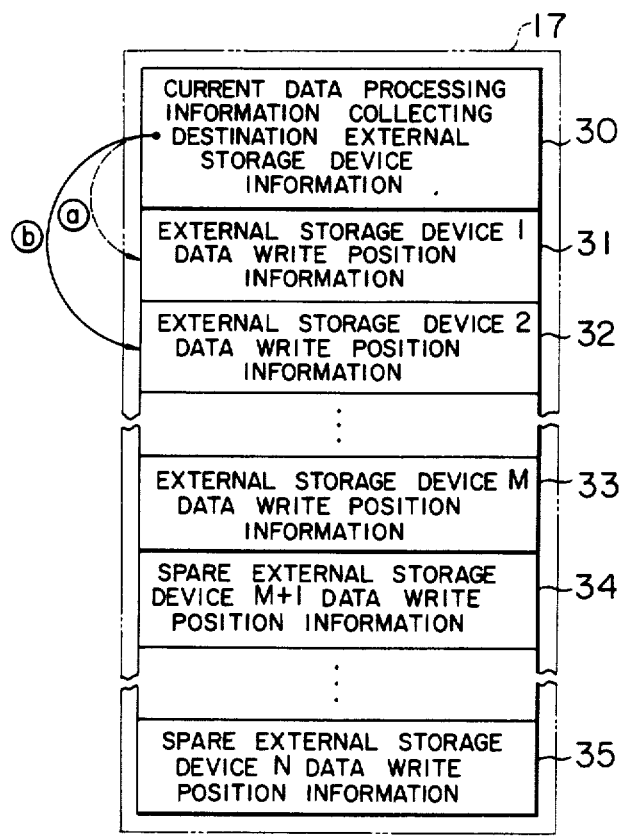
FIG. 2 depicts in detail the table 17 illustrated in FIG. 1.

As illustrated in detail in FIG. 2, the table 17 is used to store the data write position information items 31–33 for the external storage devices 13-1 to 13-M for determining a position on each of the external storage devices 13-1 to 13-M in which the history information is written; further it is utilized to store an information item 30 for indicating the current external storage device in which the current data processing history information is stored. The spare external storage devices 13-M+1 to 13-N are provided to cope with a case in which any one of the external storage devices 13-1 to 13-M has failed, hence the data write position information, items 34 and 35, for the spare external storage devices 13-M+1 to 13-N are also stored in the table 17.

Table 21 contains data read position information items 41–43 for each of the external storage devices 1 to N and the external storage device information 40 which has been last referenced.

Figure 4A:
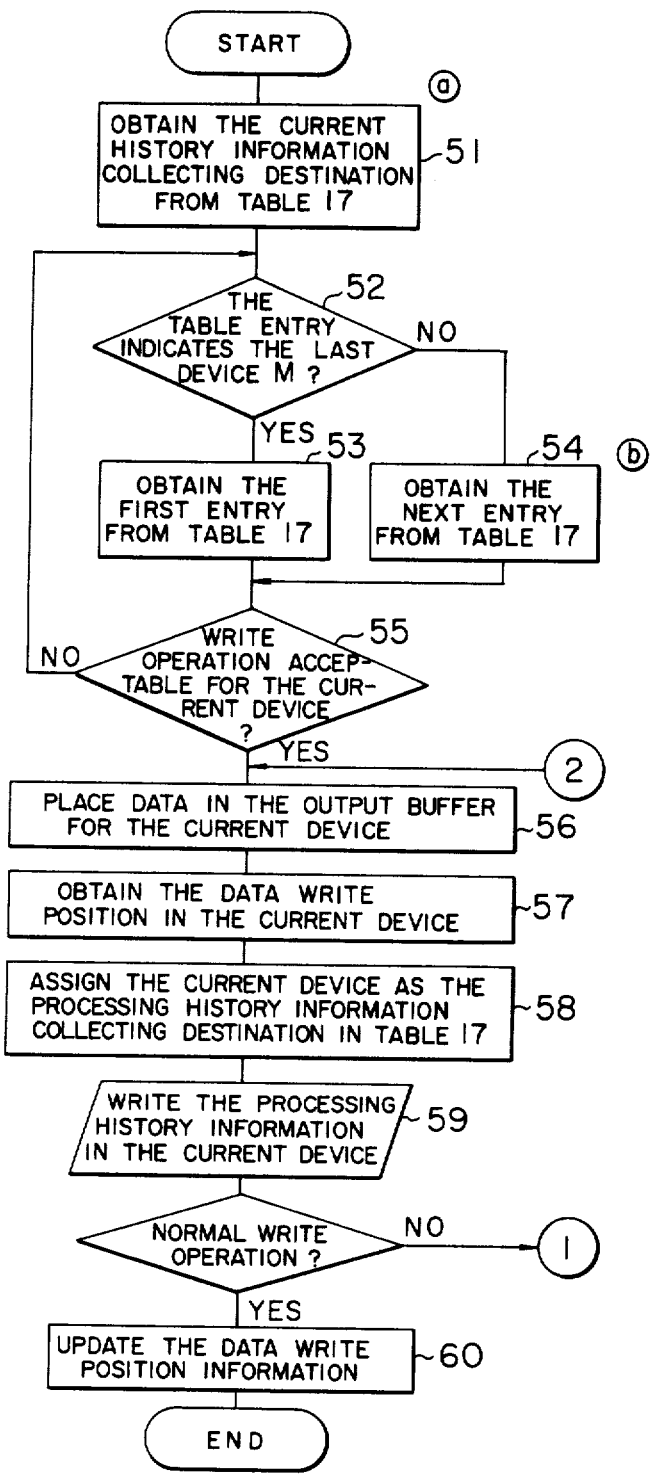
FIGS. 4a and 4b collectively illustrate the flowchart of the procedures for collecting the data processing history information.
Figure 4B:
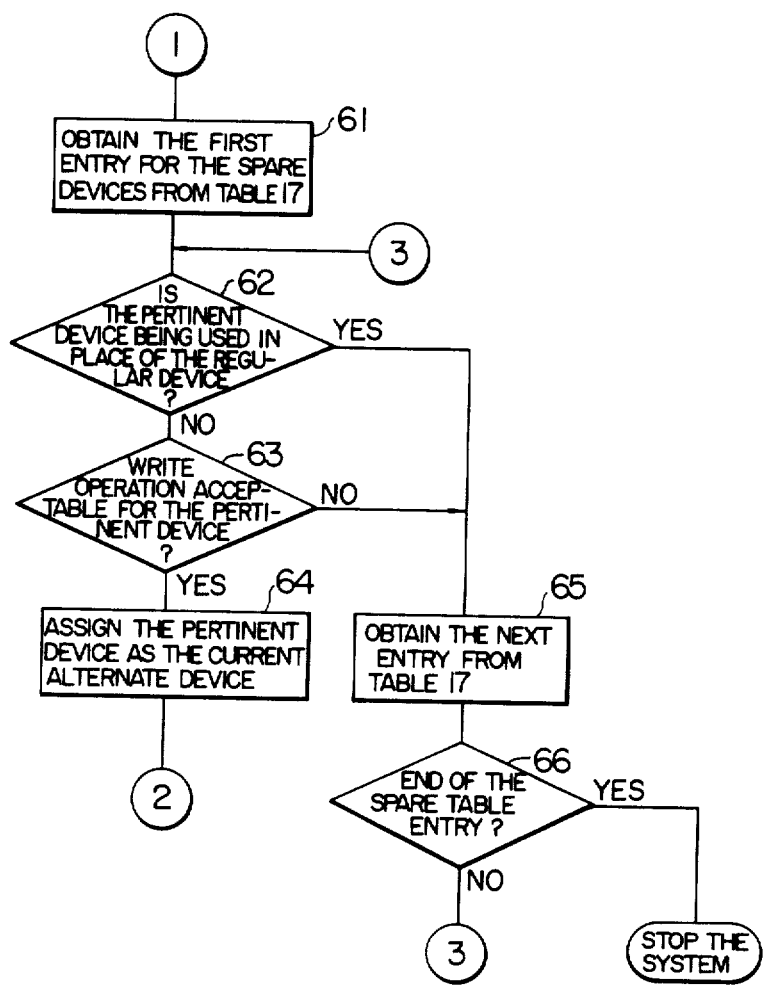

Next, the method for collecting the data processing history information by distributing the information to a plurality of external storage devices will be described in conjunction with FIG. 1, FIG. 2, and the flowchart collectively depicted in FIGS. 4a and 4b. The data processing history information is sequentially created as the processing is carried out in a data processing system. When a history information item to be collected occurs, the external storage device in which the current data processing history information is to be collected is determined by reading the information 30 indicating the destination external storage device collecting the current data processing history information from the table 17 (step 51). Then, the table entry for the destination external storage device collecting the current data processing history information is tested to determine whether or not it indicates the last external storage device 13-M among the external storage devices currently being used (step 52). If this is the case, the external storage device 1 corresponding to the first entry of the table 17 (step 53) is obtained; otherwise, the external storage device corresponding to the next entry of the table 17 is obtained (step 54). It is assumed that the external storage devices 13-1 to 13-M are utilized cyclically. Consequently, the external storage device corresponding to the number following that stored as the above-mentioned entry is regarded as the objective external storage device for collecting the history information. The system then examines whether or not a write operation can be conducted on the external storage device determined in the step 53 or 54 (step 55). For example, whether the external storage device is in a blocked state and whether it is already full are detected. The processing returns to the step 52 if the write operation is not acceptable. These steps 51-55 form the procedure for determining the device in which the history information is to be written.

If it is found that the write operation can be performed on the pertinent external storage device in step 55, the history information is moved into the output buffer for the external storage device (step 56), then an appropriate entry for this write operation is read from the items 31-33 of the table 17 to obtain the write position on the external storage device (step 57). This makes it possible to determine the write position on the external storage device in which the history information is to be written.

The information 30 of the table 17 which indicates the destination for storing the current processing history information is updated to indicate the obtained external storage device (step 58). The processing history information moved into one of the output buffers described above is written in the external storage device, then the write operation is checked to determine whether or not it has been completed normally. For a normal write operation, the data write position item stored in the table 17 corresponding to the external storage device on which the write operation had been effected is updated according to the amount of the history information written in the external storage device (step 60), thereby completing the operation for collecting the data processing history information.

If the write operation is abnormal, the system proceeds to the step for selecting an external storage device from the spare external storage devices 13-M+1 to 13-N on which the write operation can be performed. Initially, the first entry indicating a spare external storage device is obtained from the table 17 (step 61). It is determined whether or not the spare external storage device corresponding to the first entry is being used as an alternate device replacing the faulty regular external storage device (step 62). If this is not the case, the system checks to determine whether or not a write operation is acceptable for the spare external storage device (step 63). If the write operation is allowed, the spare external storage device is assigned as the current alternate external storage device (step 64). After this point, the processing is carried out according to the processing flow consisting of the steps 56-60. If the spare external storage device is found to be currently in use as an alternate device in the step 62, the spare external storage device correspondingly to the entry immediately following the above-mentioned entry is obtained from the table 17 (step 65). The system then examines whether or not the next spare external storage device is found as an entry of the table 17 (step 66). If it is found, the processing proceeds to the step 62; otherwise, the system is stopped.

Figure 3:
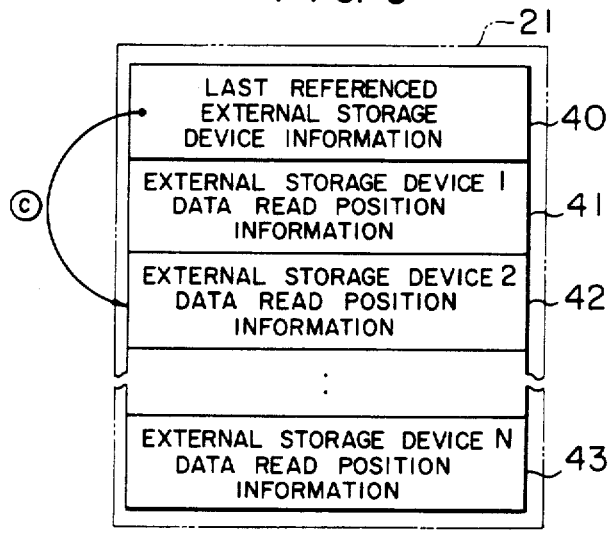
FIG. 3 is a schematic diagram showing details of the table 21 depicted in FIG. 1.
Figure 5:
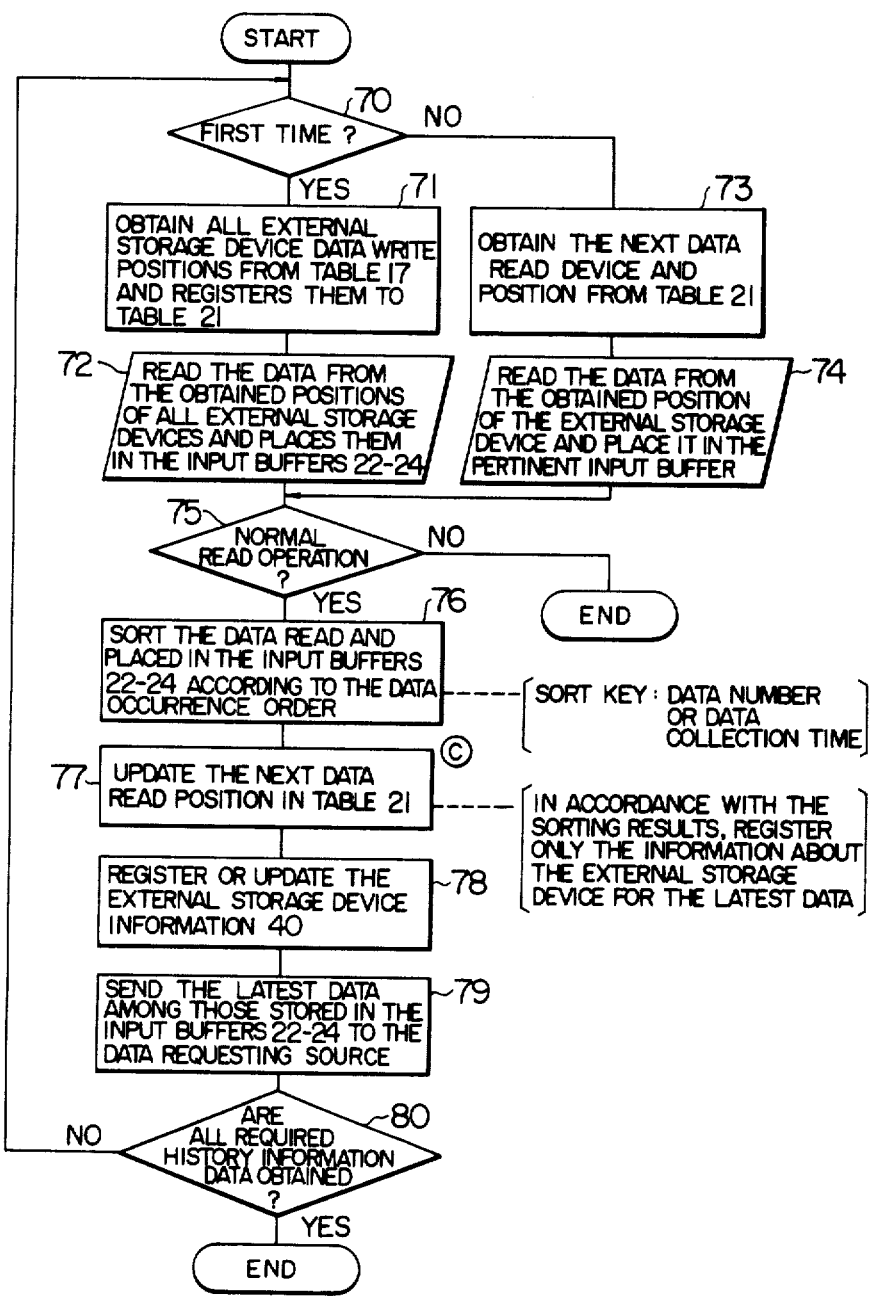
FIG. 5 is the flowchart of the processing to reference the data processing history information as collected in accordance with the flowchart depicted in FIG. 4.

A method for collecting the data processing history information has been described in which the information items are distributed to a plurality of external storage devices according to the order of occurrence of the history information by use of a round-robin system. In the following paragraphs, a method for referencing the data processing history information collected by distributing the history information items to these external storage devices will be described in accordance with the flowchart depicted in FIG. 5. The information collected according to the order of occurrence of the information by use of the round robin system is referenced with the help of the sequential access technique in the order of occurrence of the information or the latest occurrence thereof. The method of accessing the history information in the lastest occurrence order will be described hereafter. The system examines whether or not the write operation is the first request thereof (step 70). If it is the first write request, the latest data write positions for all the external storage devices 13-1 to 13-N are read from the table 17 and a read position for the latest data is obtained for each of the external storage devices based on the latest data write positions. Then the read positions are stored in the table 21 as the data read position information for the external storage devices 13-1 to 13-N as illustrated in FIG. 3, thereby constructing the table 21 (step 71). Then, the history information is read by using the data read position information obtained for each of the external storage devices 13-1 and 13-N, then it is stored in the corresponding one of the input buffers 22-24 (step 72). If the read operation is found to be other than the first request in the step 70, the next entry of the external storage device to be read and associated data read position information are read from the table 21 (step 73). The data in the data read position of the external storage device is fetched in the corresponding input buffer (step 74). Then the fetch operation is checked to determine whether or not it has been completed normally (step 75). If it is abnormal, the system is stopped; if normal, the data items fetched in the input buffers 22-24 are sorted according to the order of the data occurrence (step 76). In this sorting operation, the serial data number or the data collection time is used as the sorting key. This provision allows the data having the greatest data serial number or the latest data collection time to be referenced as the latest data. Then, the read position for the data next to the latest data is registered as the read position information (that is, one of the entries 41-43) corresponding to the external storage device in which the latest data (latest history information) is stored (step 77). For the first read operation, the information indicating the external storage device in which the latest data is stored is registered as the entry 40 of the table 21; whereas, for the second and subsequent read operations, the entry 40 is updated with the information indicating the external storage device in which the latest data is stored (step 78). The latest data stored in the input buffers 22-24 is sent to the data requesting source which has issued a request to read the data (step 79).

As will be clear from the foregoing explanations, the last history information data is fetched and placed in the input buffers 22-24, and the latest history information data among those stored in these input buffers 22-24 is transferred to the requesting source (steps 71-79). Then, the next latest history information data is read from that external storage device storing the history information which has been transferred to the requesting source, and it is stored in the corresponding input buffer (steps 73-74). Thereafter, the latest history information data is selected from those stored in the input buffers 22-24 and is delivered to the requesting source (steps 76-79). These procedures are repeatedly performed until all the necessary history information items are read out completely. If the history information data is cyclically stored in a plurality of external storage devices, such history information data can be read cyclically from the external storage devices. If an external storage device is found to be faulty when the history information is to be written therein, the cyclic write operation is not carried out. In accordance with the read method of the present embodiment, the history information items can be sequentially read beginning from the latest history information data.

In accordance with the embodiment described above, since the data processing history information can be collected by distributing the data processing history information items to an arbitrary number of external storage devices, the load imposed on each external storage device can be reduced to the value obtained by dividing the total load by the number of the provided external storage devices, thereby realizing an online journal system utilizing DASD's which is applicable to a high-traffic online system, for example, an online banking system for processing a great amount of business data.

Furthermore, a variety of online journal management methods can be implemented in accordance with the configuration of the tables 17 and 21.

It will be appreciated from the foregoing description of the present invention that the processing history information of a data processing system can be collected by distributing the processing history information data to a plurality of external storage devices in accordance with the present invention and that an advantageous effect is achieved in which the online journal by use of DASD's also is available in a high-traffic online system.

We claim:

1. A history information managing method for use in a data processing system which includes;
   at least three external storage device for storing therein history information of various lengths;
   first means for storing therein write position information indicating a position within a respective external storage device in which new history information is to be written for each said external storage device; and
   second means for storing therein information indicating one of said external storage devices in which history information has been most recently written; said history information managing method comprising:
   a first step of selecting one of said external storage devices in which the history information is to be next written in accordance with said second means;
   a second step of reading out from said first means write position information corresponding to said one of the external storage devices selected in said first step;
   a third step of writing the history information in a position indicated by said write position information which has been read out of said second step for said one of the external storage devices selected in said first step;
   a fourth step of updating the content of said second means after processing of said first step; and
   a fifth step of updating the write position information stored in said first means for said one of the external storage devices after processing of said second step in accordance with the length of the history information written in said third step.

2. The history information managing system according to claim 1, wherein said first step selects one of said external storage devices cyclically each time the history information to be written occurs.

3. The history information managing system according to claim 2, wherein said external storage devices include spare external storage devices, and
   said first step selects one of said spare external storage devices in response to a detection of a faulty one of said external storage devices.

4. The history information managing system according to claim 1, wherein said data processing system further includes buffers corresponding to said external storage devices; and said history information managing system further comprises:
   a sixth step for reading out the latest history information from each said external storage device and for storing said latest history information in said buffers, respectively; and
   a seventh step for selecting the latest history information from said history information fetched in said buffers and for transferring said latest history information to a source that has issued a request to obtain said history information.

5. The history information managing system according to claim 4, wherein said data processing system further includes third means for storing information indicating one of said external storage devices, and wherein
   said sixth step includes storing in said third means information indicating the external storage device which stores therein said history information transferred to said requesting source and reading out the latest history information from an external storage device indicated by said information stored in said third means.

* * * * *